US011643972B2

(12) United States Patent
Hrubec et al.

(10) Patent No.: US 11,643,972 B2
(45) Date of Patent: May 9, 2023

(54) TURBOMACHINES AND EPICYCLIC GEAR ASSEMBLIES WITH SYMMETRICAL COMPOUND ARRANGEMENT

(71) Applicant: GE Avio S.r.l., Rivalta di Torino (IT)

(72) Inventors: Juraj Hrubec, Prague (CZ); Michele Gravina, Milan (IT); Andrea Piazza, Rivalta di Torino (IT)

(73) Assignee: GE Avio S.R.L.

( * ) Notice: Subject to any disclaimer, the term of this patent is extended or adjusted under 35 U.S.C. 154(b) by 0 days.

(21) Appl. No.: 17/347,347

(22) Filed: Jun. 14, 2021

(65) Prior Publication Data
US 2021/0388770 A1 Dec. 16, 2021

(30) Foreign Application Priority Data

Jun. 15, 2020 (IT) .................. 102020000014206
Jul. 3, 2020 (IT) .................. 102020000016168

(51) Int. Cl.
*F02C 7/36* (2006.01)
*F02C 7/06* (2006.01)

(52) U.S. Cl.
CPC .............. *F02C 7/36* (2013.01); *F02C 7/06* (2013.01); *F05D 2240/54* (2013.01); *F05D 2260/40311* (2013.01); *F05D 2260/98* (2013.01)

(58) Field of Classification Search
CPC .......... F02C 7/36; F02C 7/06; F05D 2240/54; F05D 2260/40311; F05D 2260/98; F16H 1/46; F16H 2057/085
See application file for complete search history.

(56) References Cited

U.S. PATENT DOCUMENTS

| | | | |
|---|---|---|---|
| 3,307,433 A * | 3/1967 | Bennett | F16H 1/46 74/411 |
| 6,966,865 B2 | 11/2005 | Drago et al. | |
| 7,926,259 B2 | 4/2011 | Orlando et al. | |
| 8,931,285 B2 * | 1/2015 | McCune | F02C 7/36 184/6.12 |
| 8,939,714 B1 * | 1/2015 | McCune | F02C 3/107 415/122.1 |
| 11,339,725 B2 * | 5/2022 | Simon | F16H 1/28 |
| 2013/0192264 A1 * | 8/2013 | McCune | F02K 3/06 74/395 |
| 2014/0250860 A1 * | 9/2014 | Sidelkovskiy | B64D 27/10 60/39.15 |

(Continued)

FOREIGN PATENT DOCUMENTS

| | | | | |
|---|---|---|---|---|
| CN | 104220729 A | * | 12/2014 | .............. F02C 7/36 |
| EP | 2 674 358 A2 | | 12/2013 | |

(Continued)

OTHER PUBLICATIONS

Office Action, dated Feb. 8, 2021, issued for Italian Patent Application No. 102020000014206, 9 pages.

*Primary Examiner* — Woody A Lee, Jr.
*Assistant Examiner* — Joshua R Beebe
(74) *Attorney, Agent, or Firm* — Klarquist Sparkman, LLP

(57) ABSTRACT

A gear assembly for use with a turbomachine comprises a sun gear, a plurality of planet gear layshafts that each support a first stage planet gear and a second stage planet gear, and a ring gear. The sun gear is configured to rotate about a longitudinal centerline of the gear assembly, and the plurality of planet gear layshafts have a tubular shape.

18 Claims, 11 Drawing Sheets

(56) References Cited

U.S. PATENT DOCUMENTS

2019/0360356 A1* 11/2019 Savaria .................... F16H 1/28
2021/0017910 A1* 1/2021 Spruce ...................... F16H 1/06

FOREIGN PATENT DOCUMENTS

| EP | 3 444 465 A2 | 2/2019 | |
|---|---|---|---|
| EP | 3444465 A2 * | 2/2019 | ............... F02C 7/36 |
| EP | 2 998 615 B1 | 7/2019 | |
| EP | 3 572 690 A1 | 11/2019 | |
| EP | 3 726 031 A1 | 10/2020 | |
| GB | 691775 A | 5/1953 | |
| WO | WO 2010/030724 | 3/2010 | |

* cited by examiner

TURBOMACHINES AND EPICYCLIC GEAR ASSEMBLIES WITH SYMMETRICAL COMPOUND ARRANGEMENT

ACKNOWLEDGMENT OF GOVERNMENT SUPPORT

The project leading to this application has received funding from the Clean Sky 2 Joint Undertaking (JU) under grant agreement No 945541. The JU receives support from the European Union's Horizon 2020 research and innovation programme and the Clean Sky 2 JU members other than the Union.

CROSS REFERENCE TO RELATED APPLICATIONS

This application claims the benefit of Italian Application No. 102020000014206, filed Jun. 15, 2020 and Italian Application No. 102020000016168, filed Jul. 3, 2020, both of which are incorporated herein by reference.

BACKGROUND

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than a traditional turbofan engine, potentially improving propulsive efficiency over conventional turbofan engine designs.

Engine designs for turbomachines, including turbofans and especially open rotor engines, may require large gear ratios between the low speed spool and the fan rotor to permit the larger rotor blades to act upon a larger volume of air and/or to do so at certain desired operating speeds of the engine or aircraft. One challenge is that known gear assemblies may provide inadequate gear ratios for desired operations. For example, known gear assemblies may inadequately reduce the output rotational speed relative to the input rotational speed, such that the fan rotor operates too fast and inefficient and/or the turbine operates too slow and inefficient.

As such, there is a need for gear assemblies that provide desired gear ratios as may be suitable for turbomachines, including open rotor engines.

BRIEF DESCRIPTION

Aspects and advantages of the invention will be set forth in part in the following description, or may be obvious from the description, or may be learned through practice of the technology disclosed in the description.

Various turbomachine engines and gear assemblies are disclosed herein. In some embodiments, a turbomachine engine that includes a fan assembly and a core engine comprising a turbine and an input shaft rotatable with the turbine is provided. A single-stage epicyclic gear assembly receives the input shaft at a first speed and drives an output shaft coupled to the fan assembly at a second speed, the second speed being slower than the first speed. The gear assembly comprises a sun gear, a plurality of planet gears, and a ring gear. The sun gear rotates about a longitudinal centerline of the gear assembly and has a sun gear-mesh region along the longitudinal centerline of the gear assembly where the sun gear is configured to contact the plurality of planet gears. A ring gear-mesh region is provided along the longitudinal centerline of the gear assembly where the ring gear is configured to contact the plurality of planet gears. The sun gear-mesh region is axially offset from the ring gear-mesh region along the longitudinal centerline.

These and other features, aspects and advantages of the present disclosure will become better understood with reference to the following description and appended claims. The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

A full and enabling disclosure of the present invention directed to one of ordinary skill in the art, is set forth in the specification, which makes reference to the appended figures, in which.

DETAILED DESCRIPTION

Figure 1:
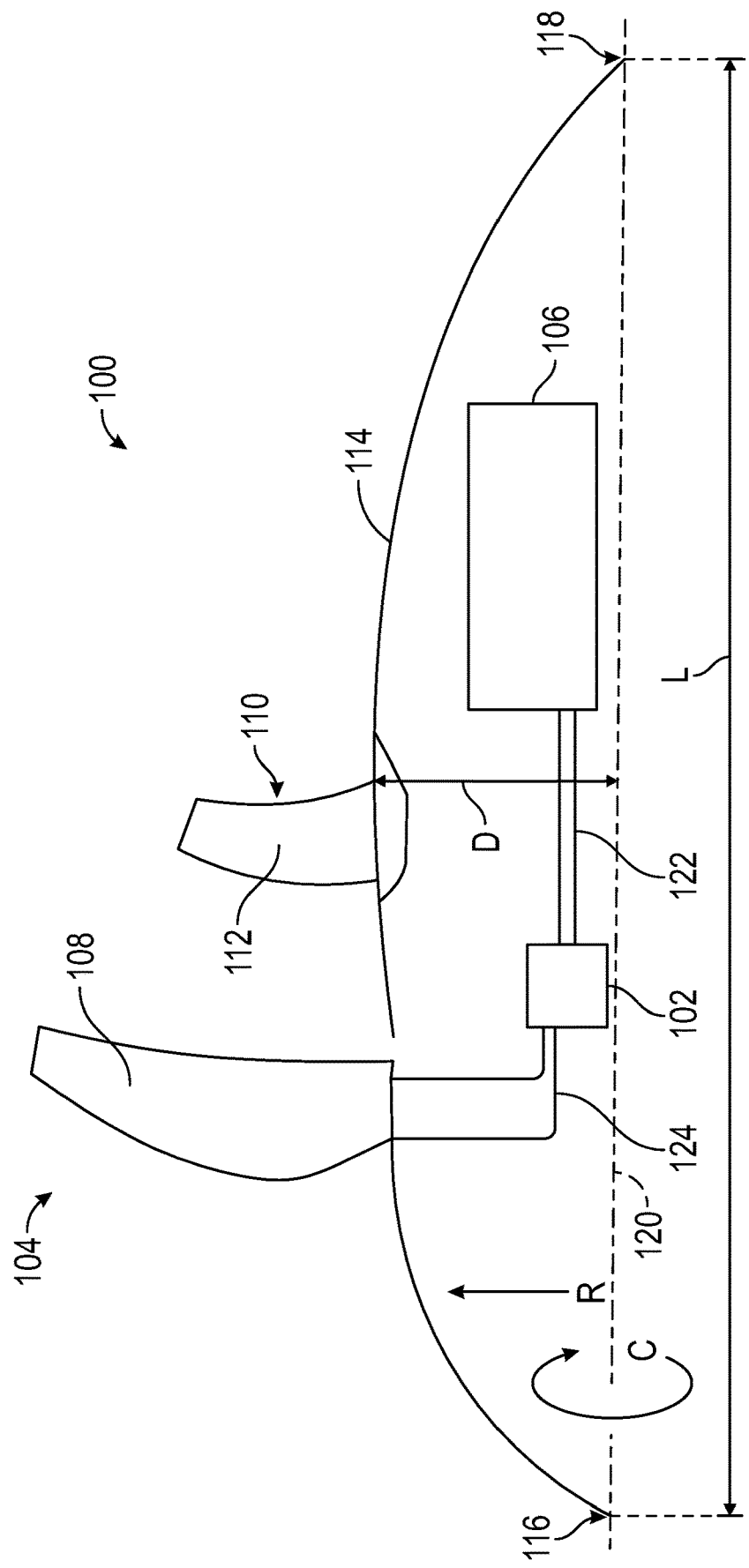
FIG. 1 is a cross-sectional schematic illustration of an exemplary embodiment of an open rotor propulsion system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter ($D_{max}$) that provides for reduced installed drag. In one embodiment, $L/D_{max}$ is at least 2. In another embodiment, $L/D_{max}$ is at least 2.5. In some embodiments, the $L/D_{max}$ is less than 5, less than 4, and less than 3. In various embodiments, it should be appreciated that the $L/D_{max}$, is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{max}$, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source 122 and provides power or torque to drive the fan assembly 104, in a circumferential direction C about the engine axis centerline 120, through a power output source 124.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Although depicted above as an unshrouded or open rotor engine in FIG. 1, it should be appreciated that the gear assemblies disclosed herein may be applied to shrouded or ducted engines, partially ducted engines, aft-fan engines, or other turbomachine configurations, including those for marine, industrial, or aero-propulsion systems. In addition, the gear assemblies disclosed herein may also be applicable to turbofan, turboprop, or turboshaft engines.

Figure 2:
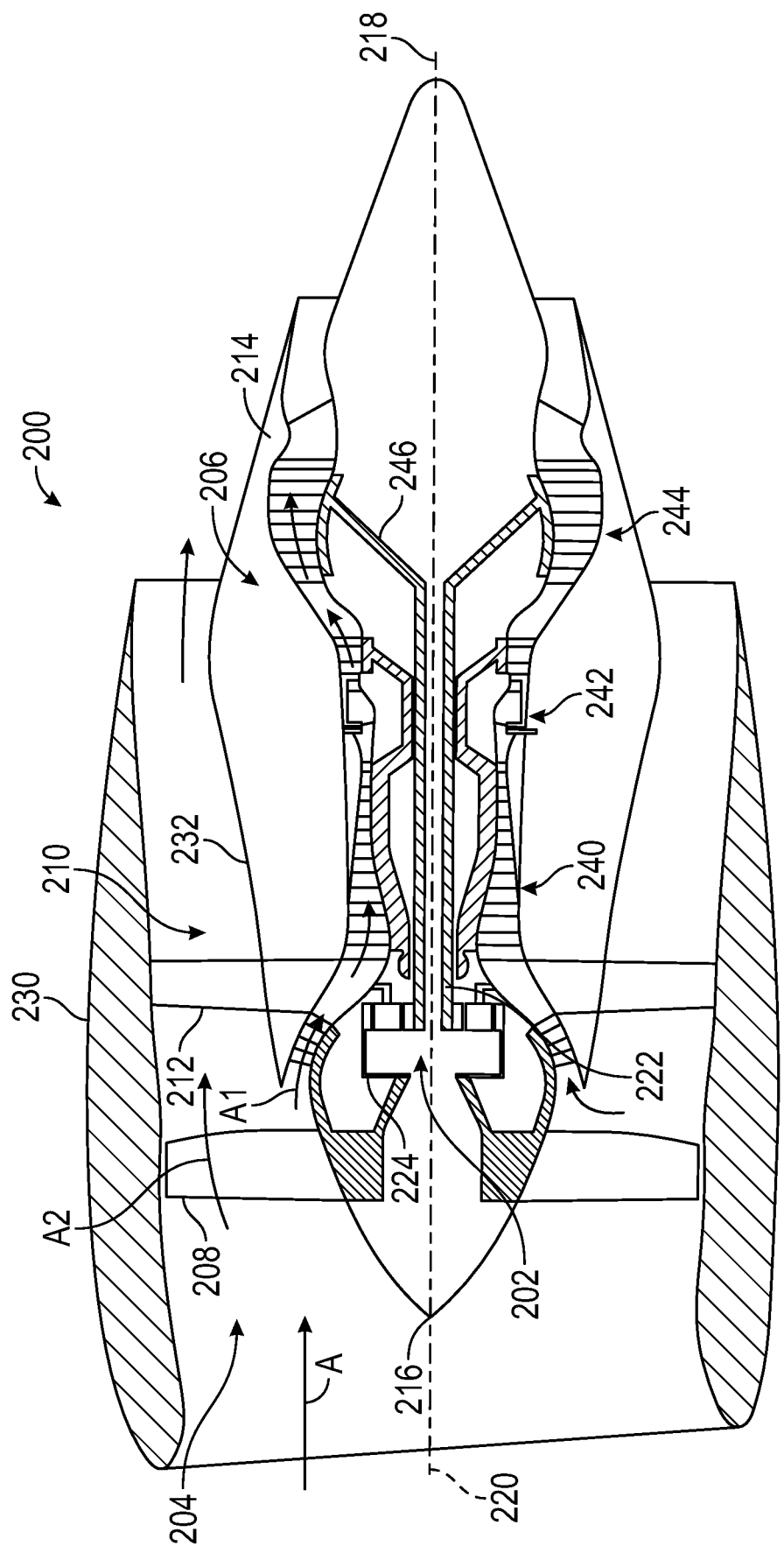
FIG. 2 is a cross-sectional schematic illustration of an exemplary embodiment of a ducted propulsion system.

For example, FIG. 2 is a cross-sectional schematic illustration of an exemplary embodiment of an engine 200 that includes the gear assembly 202 in combination with a ducted fan propulsion system. However, unlike the open rotor configuration of FIG. 2, the fan assembly 204 and its fan blades 208 are contained within an annular fan case 230 and the vane assembly 210 and the vanes 212 extend radially between the fan cowl 232 and the inner surface of the fan case 230. As discussed above, the gear assemblies disclosed herein can provide for increased gear ratios for a fixed gear envelope (e.g., with the same size ring gear), or alternatively, a smaller diameter ring gear may be used to achieve the same gear ratios.

As shown in FIG. 2, the core engine 206 is generally encased in outer casing 214, and has a length extending from a longitudinally forward end 216 to a longitudinally aft end 218. The exemplary core engine (for a ducted or unducted engine) can include a compressor section 240, a heat addition system 242 (e.g., combustor), and an expansion section 244 together in serial flow arrangement. The core engine 206 extends circumferentially relative to an engine centerline axis 220. The core engine 206 includes a high-speed spool that includes a high-speed compressor and a high-speed turbine operably rotatably coupled together by a high-speed shaft. The heat addition system 232 is positioned between the high-speed compressor and the high-speed turbine. Various embodiments of the heat addition system 232 include a combustion section. The combustion section may be configured as a deflagrative combustion section, a rotating detonation combustion section, a pulse detonation combustion section, or other appropriate heat addition system. The heat addition system 232 may be configured as one or more of a rich-burn system or a lean-burn system, or combinations thereof. In still various embodiments, the heat addition system 232 includes an annular combustor, a can combustor, a cannular combustor, a trapped vortex combustor (TVC), or other appropriate combustion system, or combinations thereof.

The core engine 206 can also include a booster or low-speed compressor positioned in flow relationship with the high-speed compressor. The low-speed compressor is rotatably coupled with the low-speed turbine via a low-speed shaft 246 to enable the low-speed turbine to drive the low-speed compressor. The low-speed shaft 246 is also operably connected to gear assembly 202 to provide power to the fan assembly 204 via the power input source 222, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine includes the gear assembly that is configured to transfer power from the expansion section and reduce an output rotational speed at the fan assembly relative to a low-speed turbine. Embodiments of the gear assemblies depicted and described herein can allow for gear ratios suitable for large-diameter unducted fans (e.g., FIG. 1) or certain turbofans (e.g., FIG. 2). Additionally, embodiments of the gear assemblies provided herein may be suitable within the radial or diametrical constraints of the core engine within the outer casing.

The gear assemblies described herein includes a gear set for decreasing the rotational speed of the fan assembly relative to the low speed (pressure) turbine. In operation, the rotating fan blades are driven by the low speed (pressure) turbine via gear assembly such that the fan blades rotate around the engine axis centerline and generate thrust to propel the engine, and hence an aircraft on which it is mounted, in the forward direction.

Referring again to FIG. 1, it may be desirable that either or both of the fan blades 104 or the vanes 112 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 112 can be sized, shaped, and configured to impart a counteracting swirl to the fluid so that in a downstream direction aft of both fan blades 104 and vanes 112 the fluid has a greatly reduced degree of swirl, which translates to an increased level of induced efficiency. Vanes 112 may have a shorter span than fan blades 104. For example, in some embodiments, vanes 112 may have a span that is at least 50% of a span of fan blades 104. In other embodiments, the span of the vanes can be the same or longer than the span as fan blades 104, if desired. Vanes 112 may be attached to an aircraft structure associated with the engine 100, as shown in FIG. 1, or another aircraft structure such as a wing, pylon, or fuselage. Vanes 112 may be fewer or greater in number than, or the same in number as, the number of fan blades 104. In some embodiments, the number of vanes 112 are greater than two, or greater than four, in number. Fan blades 104 may be sized, shaped, and contoured with the desired blade loading in mind.

FIGS. 1 and 2 illustrate what may be termed a "puller" configuration where the fan assembly is located forward of the engine core. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

In the exemplary embodiment of FIG. 1, air enters the core engine 106 through an opening aft of the fan blades. FIG. 2 illustrates such an opening in more detail. As shown in FIG. 2, air A entering the fan assembly is divided between air that enters the core engine A1 and air that bypasses the core engine A2.

Embodiments of the gear assemblies depicted and described herein may provide for gear ratios and arrangements that fit within the $L/D_{max}$ constraints of the engine. In certain embodiments, the gear assemblies depicted and described allow for gear ratios and arrangements providing for rotational speed of the fan assembly corresponding to one or more ranges of cruise altitude and/or cruise speed provided above.

Various embodiments of the gear assemblies provided herein can allow for gear ratios of up to 14:1. Still various embodiments of the gear assembly can allow for gear ratios of at least 6:1. Still yet various embodiments of the gear assembly provided herein allow for gear ratios between 6:1 to 12:1, between 7:1 and 11:1, and between 8:1 and 10:1. It should be appreciated that embodiments of the gear assembly provided herein may allow for large gear ratios and within constraints such as, but not limited to, length (L) of the engine 10, maximum diameter ($D_{max}$) of the engine, cruise altitude of up to 65,000 ft, and/or operating cruise speed of up to Mach 0.85, or combinations thereof.

Various exemplary gear assemblies are shown and described herein. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachine having a turbine and a shaft rotatable with the turbine. With such an engine, the rotating element (e.g., fan assembly) may be driven by the shaft (e.g., low-speed shaft) of the turbomachine through the gear assembly.

Figure 3:
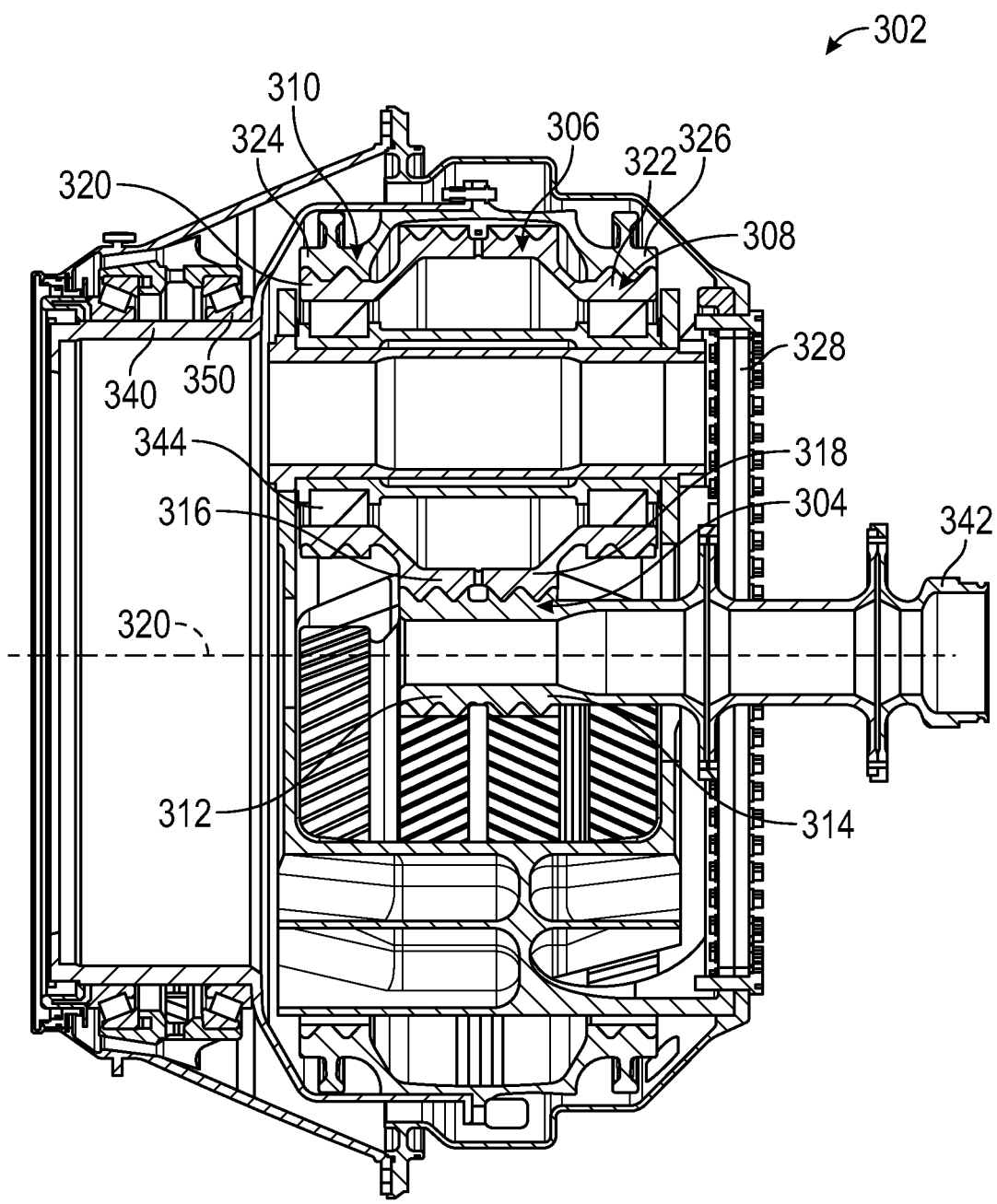
FIG. 3 is a schematic illustration of an exemplary gear assembly.

FIG. 3 illustrates an exemplary gear assembly 302 with a compound symmetrical arrangement. Gear assembly 302 includes a sun gear 304 with a diameter $D_s$, a plurality of first stage planet gears 306 with a diameter $D_{p1}$, a plurality of second stage planet gears 308 with a diameter $D_{p2}$, and a ring gear 310 with a diameter $D_r$. Each of the sun gear 304, planet gears 306, 308, and ring gear 310 are double helical gears with first and second sets of helical teeth that are inclined at an acute angle relative to each other. In particular, sun gear 204 comprises a first sun gear set 312 and a second sun gear set 314. Each of the first stage planet gears comprises a first planet gear set 316 and second planet gear set 318, and each of the second stage planet gears comprises a third planet gear set 320 and a fourth planet gear set 322. The ring gear 310 comprises a first ring gear set 324 and a second ring gear set 326.

As discussed in more detail below, the number of planet gears can vary. In one embodiment, there are three compound planet gears (e.g., 306, 308). In another embodiment, there can be two to four compound planet gears.

Figure 4:
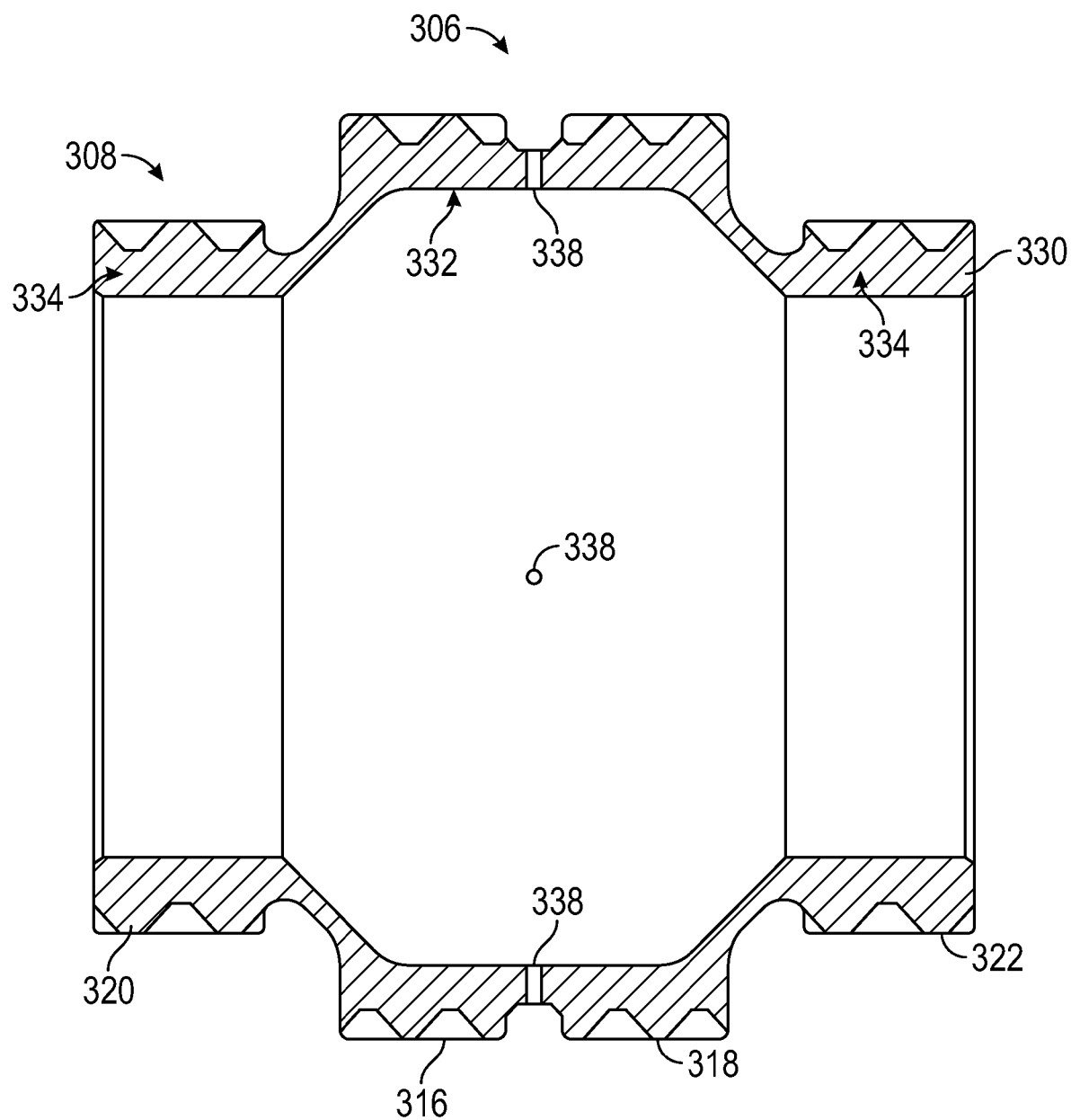
FIG. 4 is a cross-sectional view of an exemplary planet gear layshaft.

As shown in FIG. 4, the compound planet gears 306, 308 are supported by a layshaft 330 that has a tubular configuration. As used herein "tubular" means a longitudinally extending structure that has a hollow interior section. The tubular layshaft can comprise an inner surface and an outer surface that supports the first and second stage planet gears as discussed herein.

The tubular layshaft can comprise an intermediate portion 332 that supports the first stage planet gears 306 between two outer portions 334. As shown in FIG. 4 (and elsewhere), a diameter of the first stage planet gears $D_{p1}$ can be greater than a diameter of the second stage planet gears $D_{p2}$. In some embodiments, a ratio of $D_{p1}$ : $D_{p2}$ can vary from 1.0 to 2.0, or in some embodiments, from 1.2 to 1.7, or from 1.3 to 1.6, or from 1.4 to 1.5.

Because of the difference in diameters of the first and second stage planet gears, the tubular layshaft 330 can similarly vary to support these gears. Thus, as shown in FIG. 4, the intermediate portion 332 has a greater diameter than the outer portions 334, with angled portions of the layshaft extending between the intermediate portion 332 and outer portions 334.

In some embodiments, layshaft 330 can comprise a plurality of holes 338 to scavenge lubricating oil within the gear assembly. As shown in FIG. 4, the plurality of holes 338 can extend circumferentially around the layshaft 330 at the intermediate portion 332 (e.g., the enlarged portion) between first and second outer portions 334.

Figure 5:
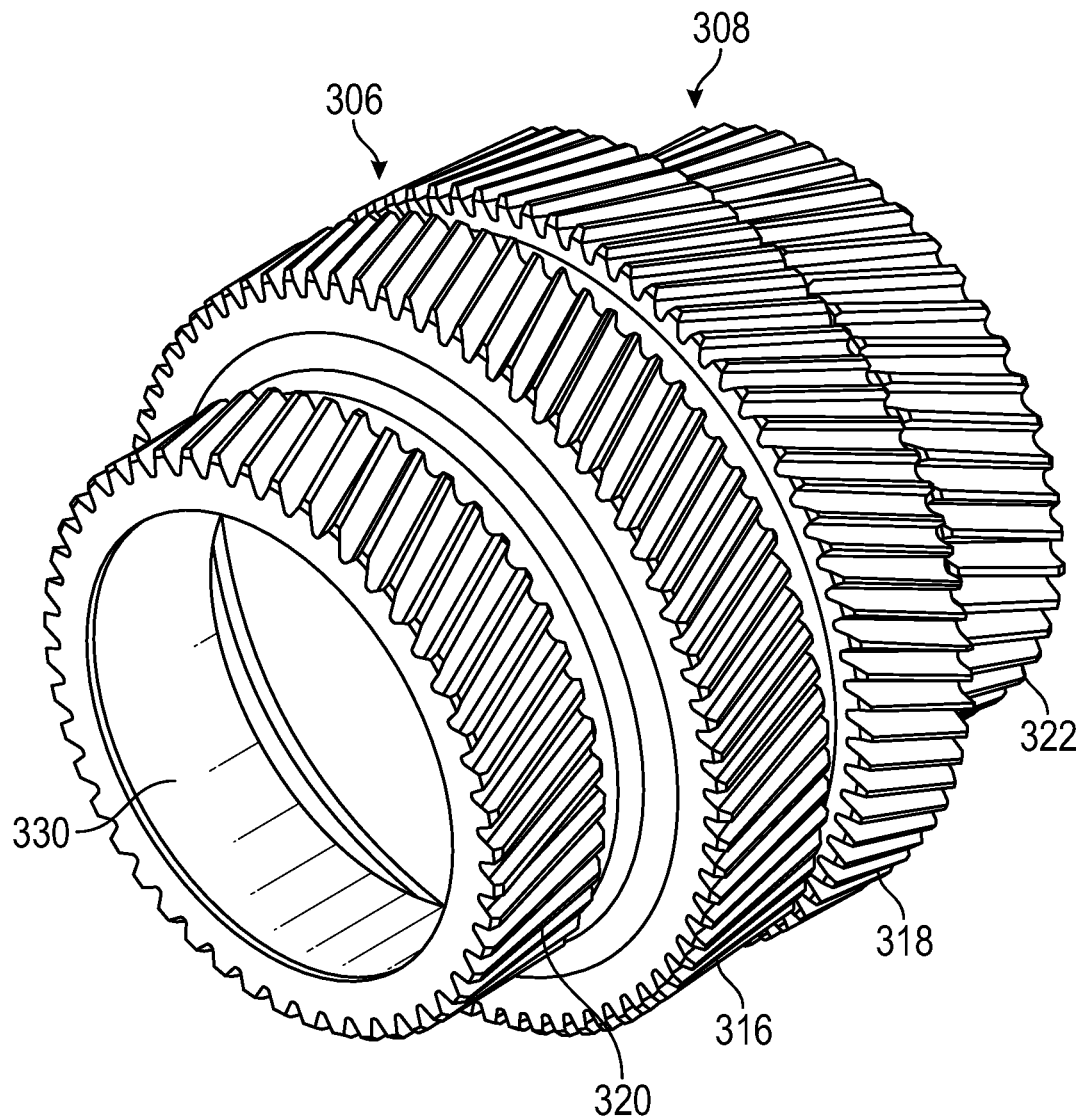
FIG. 5 is a schematic illustration of an exemplary planet gear layshaft with first and second stage planet gears.
Figure 6:
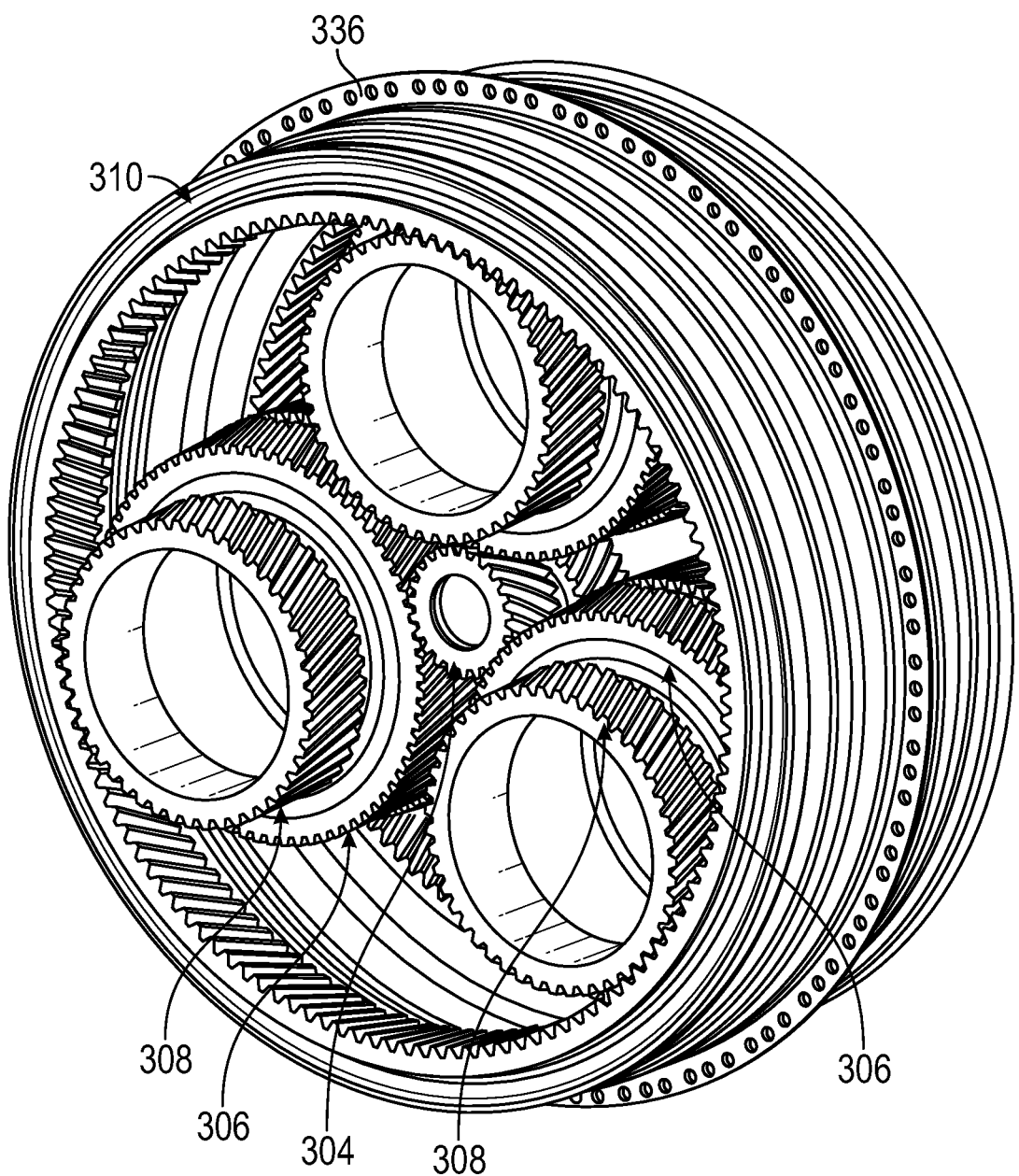
FIG. 6 is a schematic illustration of an exemplary gear assembly with compound symmetry.
Figure 7:
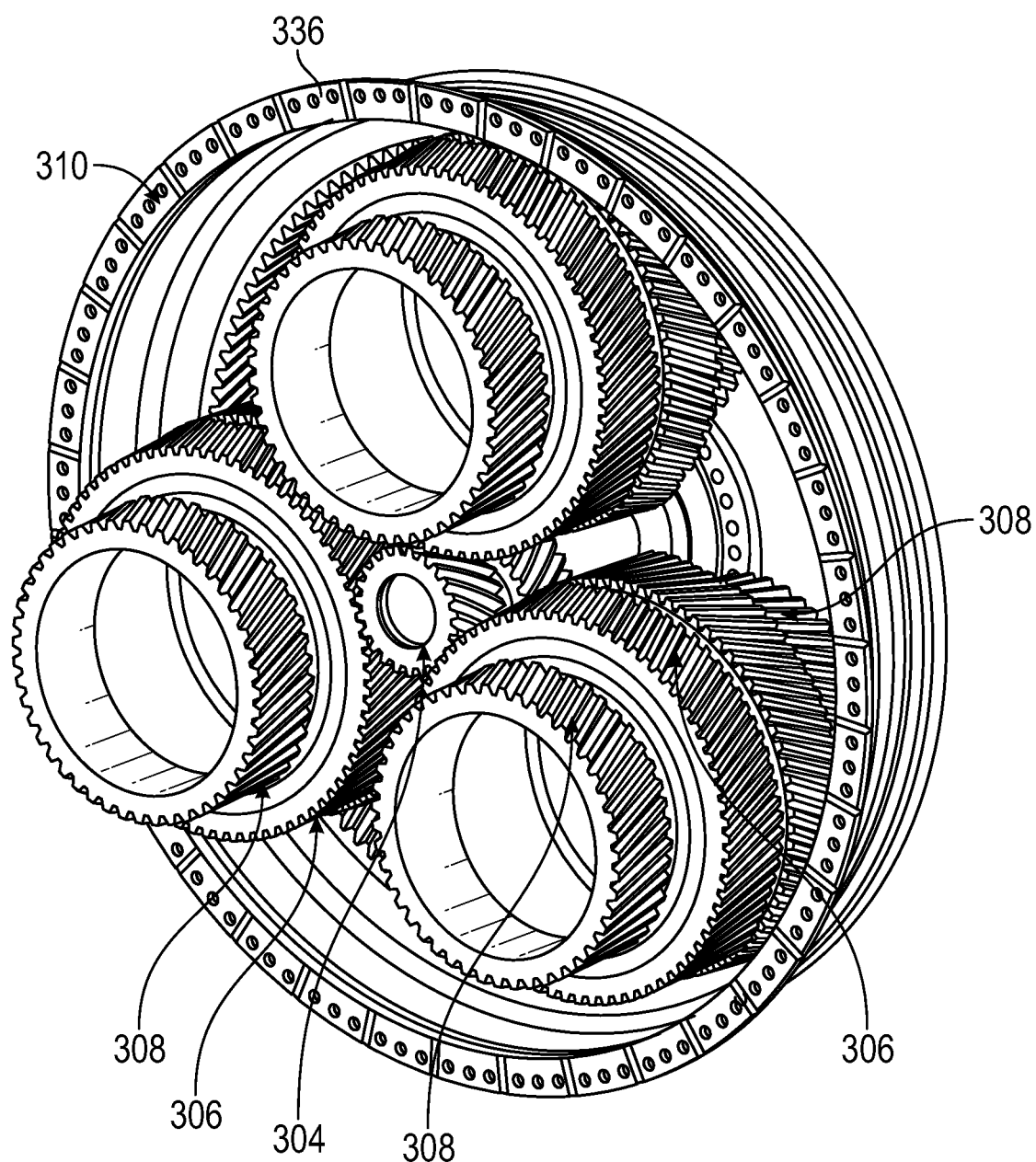
FIG. 7 is a schematic illustration of an exemplary gear assembly with compound symmetry, with a portion of a ring gear removed for clarity.

FIG. 5 illustrates the layshaft 330 and compound planet gears 306, 308. FIGS. 6 and 7 illustrate the layshaft 330 and compound planet gears 306, 308, with the ring gear 310 (FIG. 6) and with a portion of the ring gear removed (FIG. 7). In the embodiments shown in FIGS. 6 and 7, three compound planet gears are provided (306, 308) and the ring gear 310 comprises two halves with an interconnecting flanged portion 336. FIG. 7 also discloses a plurality of radial passages for oil scavenging.

Figure 8:
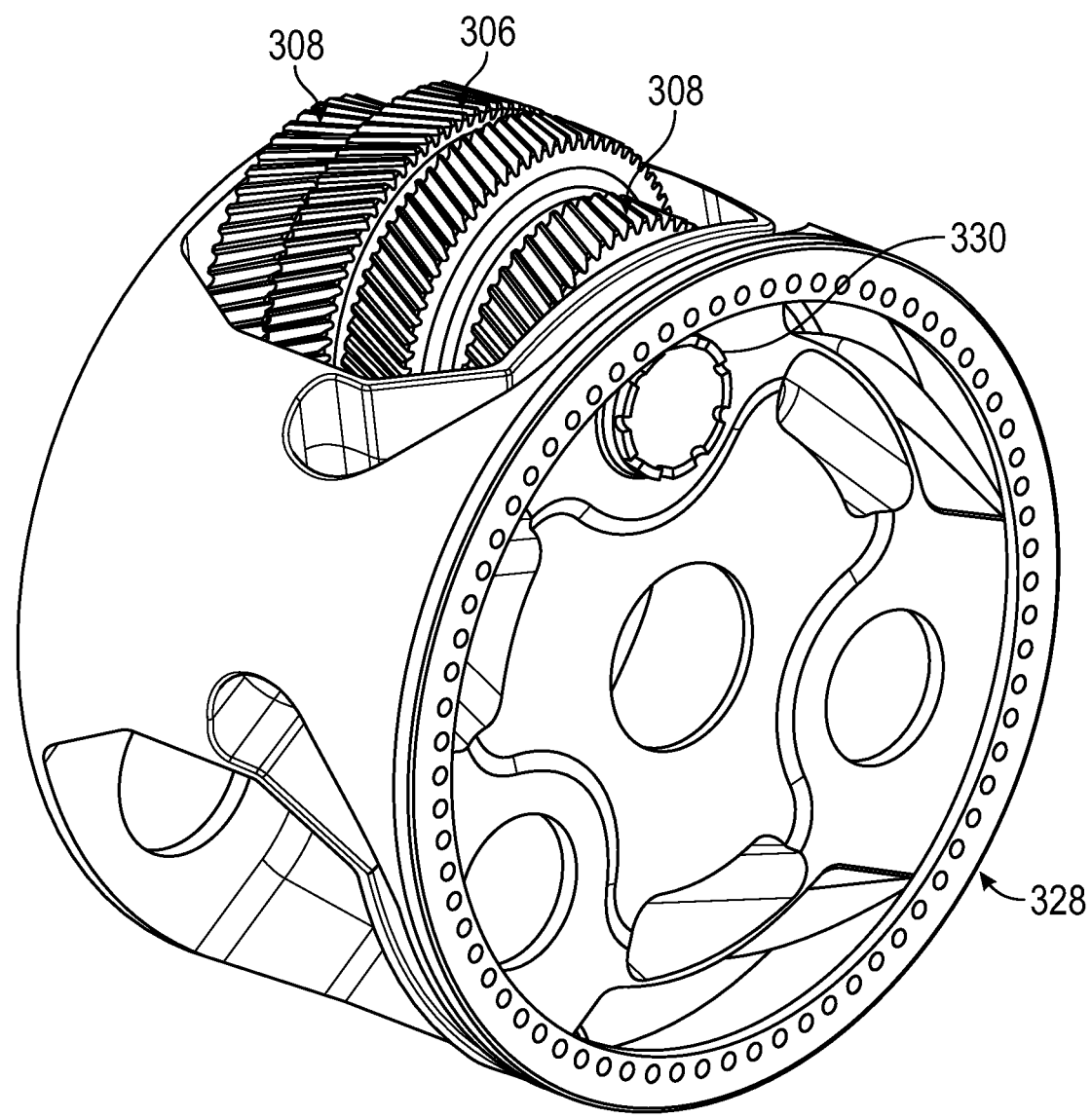
FIG. 8 is a schematic illustration of an exemplary planet carrier with a compound planet gear.
Figure 9:
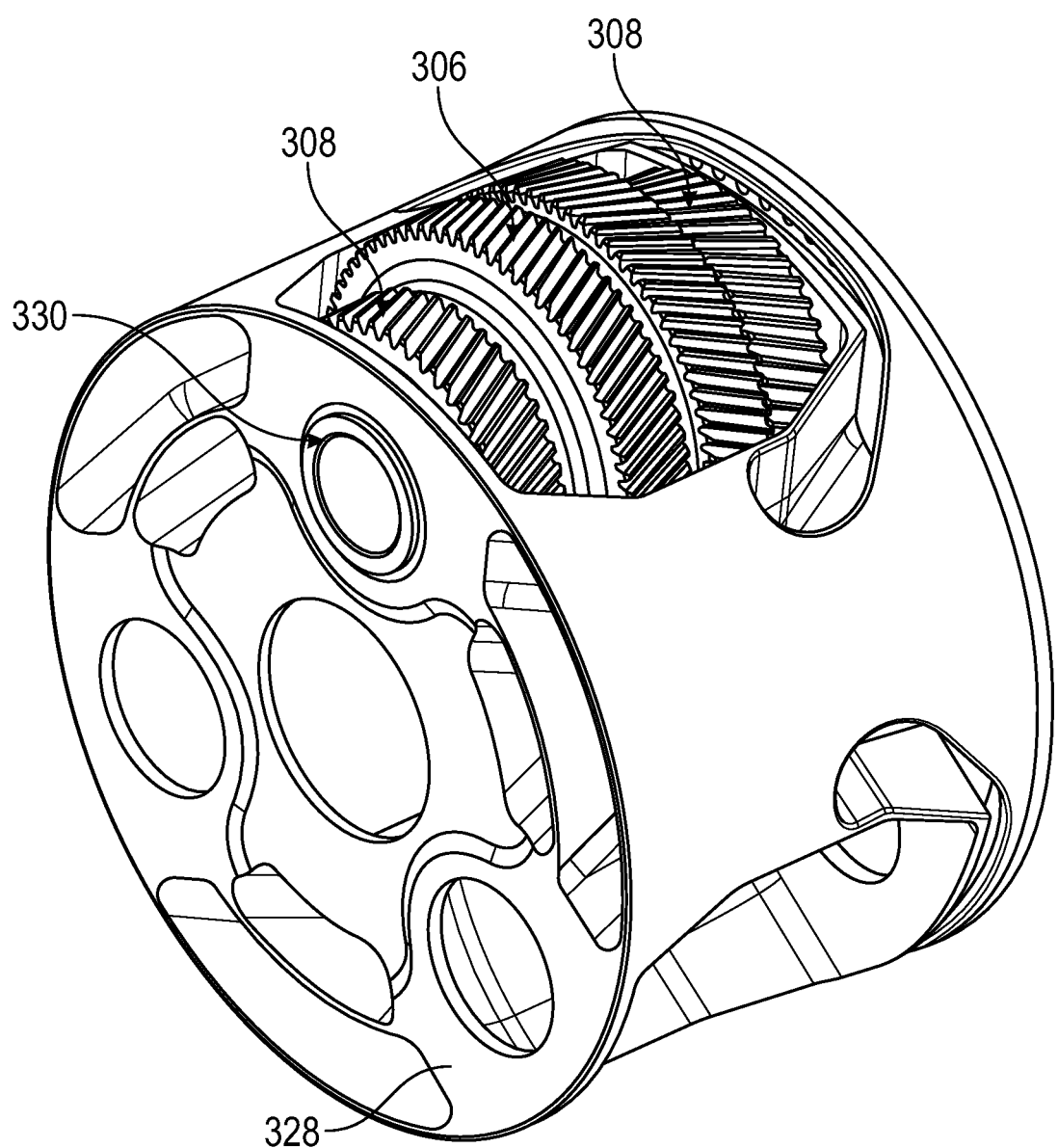
FIG. 9 is another schematic illustration of an exemplary planet carrier with a compound planet gear.

FIGS. 8 and 9 illustrate a planet carrier 328 with a single compound planet gear (306, 308) provided therein for clarity. The layshaft 330 extends through an opening in the fore and aft sides of the planet carrier 328. In some embodiments, the carrier can be connected to the engine frame via a flexible support system, with the flexible support system being configured to collect oil and scavenge oil via holes at a lower portion.

Figure 10:
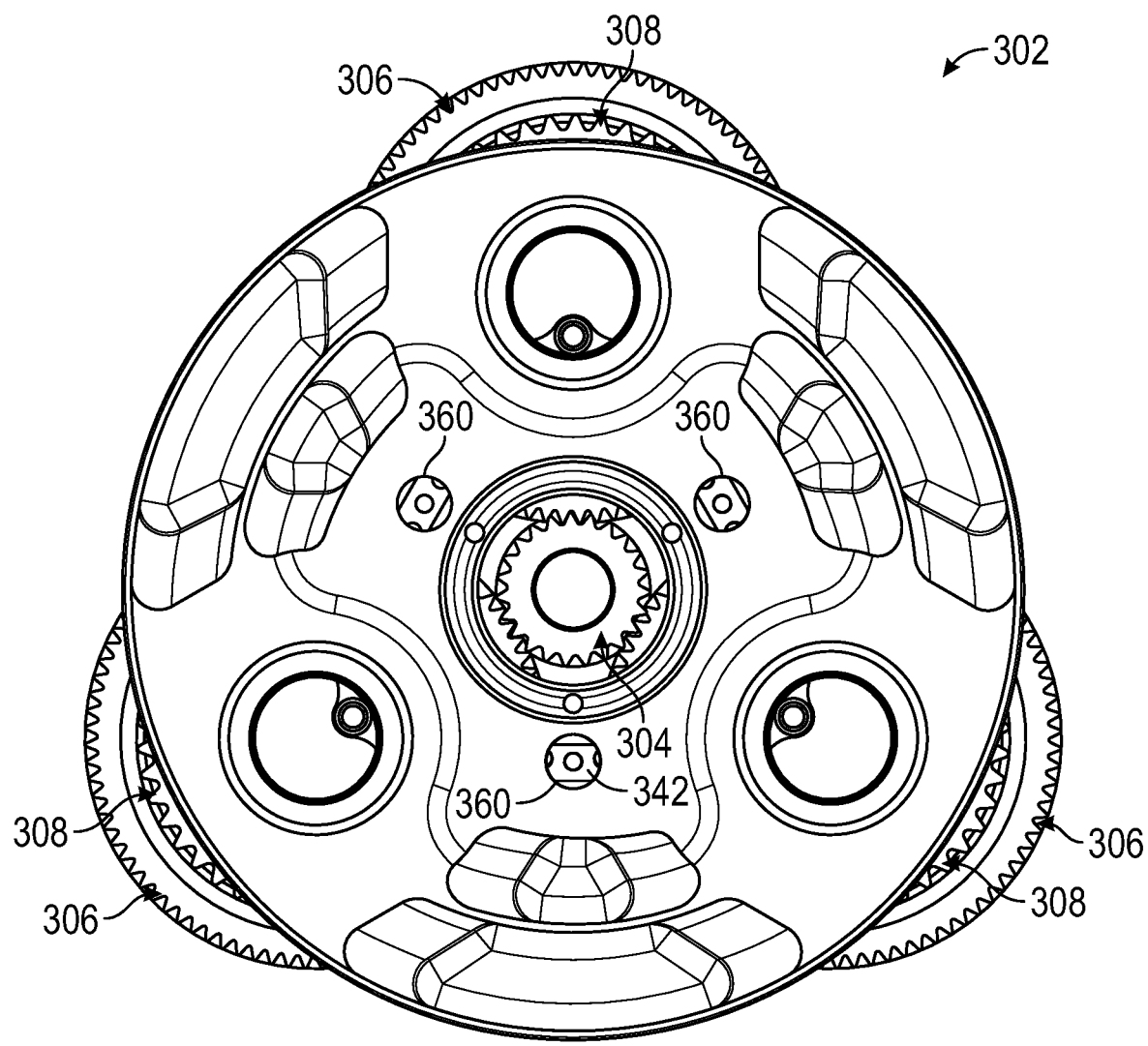
FIG. 10 is an aft-side view of an exemplary gear assembly.
Figure 11:
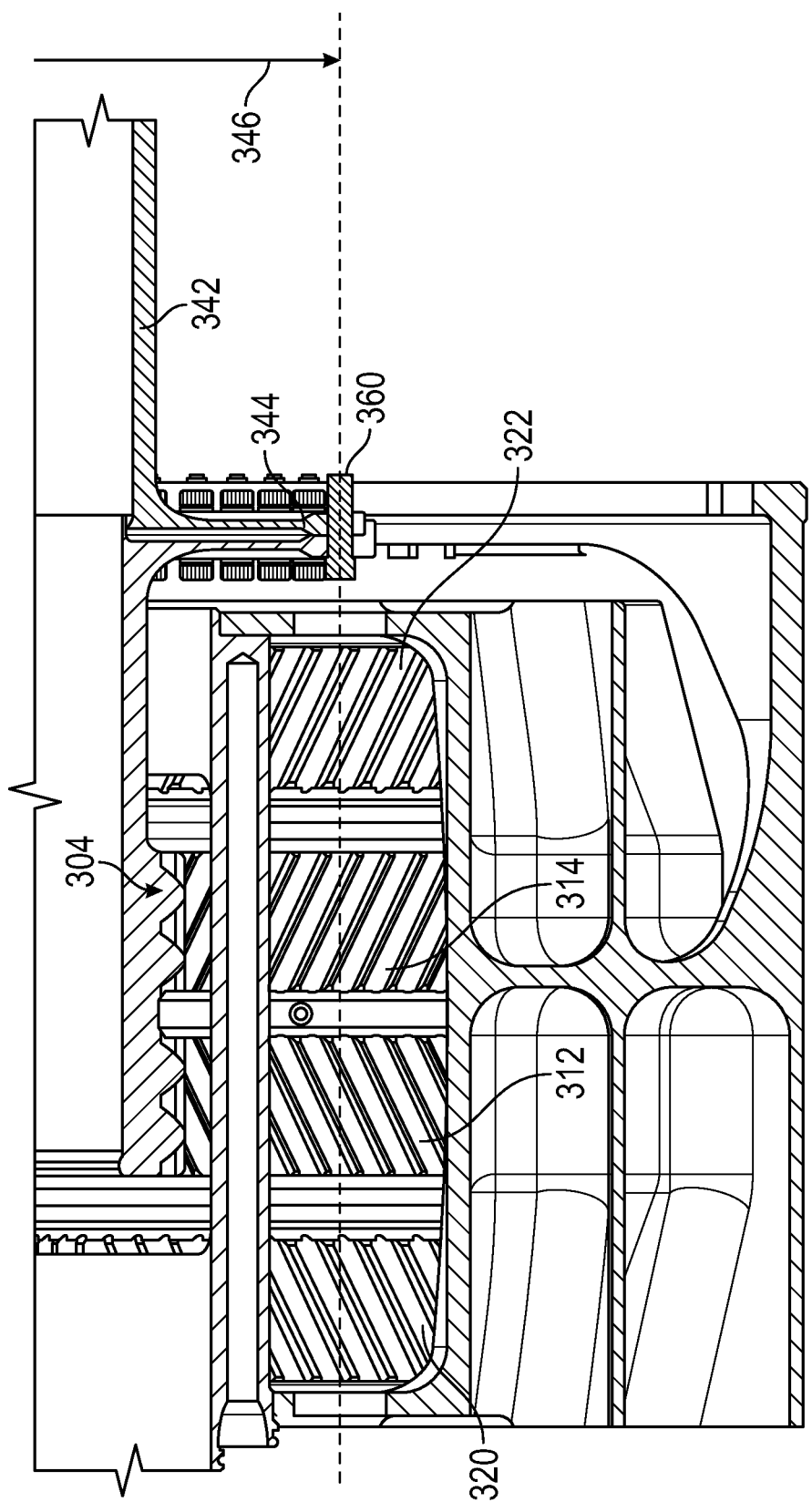
FIG. 11 is a cross-sectional view of a portion of an exemplary gear assembly.

FIG. 10 is an aft-side view of gear assembly 302, indicating a plurality of apertures 360 in the planet carrier 328 to provide assembly access to bolts associated with a flange portion 344 of input shaft 342. Referring to FIGS. 3, 10, and 11, in some embodiments, a bolting diameter of the flange portion of the input shaft can be higher than an innermost arc of a bore of the layshaft 330. In another embodiment, the bolting diameter 346 of the flange portion of the input shaft can be lower than the innermost arc of the bore of the layshaft 330.

As discussed above, the sun gear can be connected to a turbine via an input shaft 342. An input shaft can comprise a flexible connecting portion. In some embodiments, the flexible connecting portion can include at least a pair of thin flanges bolted together. In some embodiments, the flexible connecting portion can comprise radial passages for oil scavenge. In some embodiments, the input shaft 342 can be connected via a spline to the turbine shaft.

In some embodiments, the gear ratio split between the first and second stages can range from 40% to 60% for each stage (i.e., from 40% to 60% for the first stage and from 60% to 40% for the second stage).

As discussed above, in some embodiments, the sun gear 304, planet gears 306, 308, and ring gear 310 can be double helical gears with first and second sets of helical teeth that are inclined at an acute angle relative to each other.

In the embodiment shown in FIG. 3, the gear assembly 302 is a star gear configuration in which the planet carrier is generally fixed (e.g., static) within the engine by support structure. The sun gear 304 is driven by an input shaft (e.g., a low-speed shaft). A planet gear carrier 328 is rotatably coupled to a layshaft of the compound planet gears 306, 308, and the ring gear 310 is configured to rotate about the longitudinal engine axis centerline in a circumferential direction, which in turn drives the power output source (e.g., a fan shaft) that is coupled to and configured to rotate with the ring gear to drive the fan assembly. In this embodiment, the low-speed shaft rotates in a circumferential direction that is the opposite of the direction in which the fan shaft rotates.

In other embodiments, the gear assembly can have a planetary configuration in which the ring gear is fixed (e.g., static) within the engine by a support structure. The sun gear is driven by an input shaft (i.e., low-speed shaft) and instead of the ring gear rotating, the planet carrier rotates in the same direction of the low-speed shaft rotation direction, to drive the power output source (e.g., a fan shaft) and fan assembly.

Referring again to FIG. 3, the ring gear 310 is coupled to a fan drive shaft 340 to drive the fans. The sun gear 304 is coupled to an input power source (e.g., input shaft 342). In some embodiments, the input shaft can be integrally formed with the sun gear. The bi-helical meshes of the planet gears axially balance the load over the four (phased) gear sets of each compound planet gear. The second stage of planet gears 308 can be supported by two rows of cylindrical roller bearings 344 at the planet bore. In addition, the fan drive shaft 340 can be supported by tapered roller bearings 350, which supports the fan drive shaft in an axially compact manner. In some embodiments, the roller bearings can be formed from a ceramic material. In some embodiments, the roller bearings can be lubrication by under-race lubrication, in which lubrication is directed under the inner race and forced out through a plurality of holes in an inner race. In some embodiments, as shown in FIG. 3, an inner supporting element of both sets of the roller bearings 344 can be a solid unique elements.

In some embodiments, an oil transfer bearing for a pitch control mechanism can be provided on a fore side of the gear assembly, and gear assembly/pitch control oil feed lines can be provided through the static planet carrier.

In some embodiments, one of the pair of gear sets (e.g., one of the first and second gear sets, one of the third or fourth gear sets) is angularly clocked by a set amount of gear pitch relative to the other gear set. For example, the teeth of the first gear set can be angularly clocked by a first amount of the gear pitch relative to the teeth of the second gear set. The first amount can be between one fourth and one half. Similarly, the teeth of the third gear set can be angularly clocked by a second amount of the gear pitch relative to the teeth of the fourth gear set. The second amount can be between one fourth and one half.

The gear assemblies disclosed herein can provide significant advantages over conventional systems. For example, the tubular planet gear layshafts can provide reduced weight gear assemblies, while also providing improve torque reaction in the midplane section of the gear assembly. In addition, relative to conventional systems, assembly of gearboxes having tubular planet gear layshafts can be more efficient.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine engine (100, 200) comprising a fan assembly (104, 204) comprising a plurality of fan blades (108, 208); and a core engine (106, 206) comprising a turbine and an input shaft (122, 222) rotatable with the turbine; and a gear assembly (102, 202, 302) that receives the input shaft (122, 222) at a first speed and drives an output shaft (124, 224) coupled to the fan assembly (104, 204) at a second speed, the second speed being slower than the first speed. The gear assembly (102, 202, 302) comprises a sun gear (304), a plurality of planet gear layshafts (330) that each support a first stage planet gear (306) and a second stage planet gear (308), and a ring gear (310). The sun gear rotates about a longitudinal centerline (120, 220, 320) of the gear assembly and the plurality of planet gear layshafts have a tubular shape.

2. The turbomachine engine of any of the clauses herein, wherein the planet gear layshaft (330) comprises a first outer portion (334), a second outer portion (334), and an intermediate portion (332) between first and second outer portions, and the first stage planet gear (306) comprises a first gear set (316) and a second gear set (318) supported at the intermediate portion of the planet gear layshaft, and the second stage planet gear (308) comprises a third gear set (320) supported at the first outer portion of the planet gear layshaft and a fourth gear set (322) supported at the second outer portion of the planet gear layshaft.

3. The turbomachine engine of any of the clauses herein, wherein the sun gear (304), the first stage and second stage planet gears (306, 308), and the ring gear (310) comprise double helical gears.

4. The turbomachine engine of any of the clauses herein, wherein the third and fourth gear set (320, 322) are spaced apart by the first and second gear set (316, 318) and helical teeth of the third and fourth gear set (320, 322) are inclined at an acute angle relative to each other.

5. The turbomachine engine of any of the clauses herein, wherein the ring gear (310) comprises a first ring gear set (324) that meshes with the third gear set (320) and a second ring gear set (326) that meshes with the fourth gear set (322).

6. The turbomachine engine of any of the clauses herein, wherein a gear ratio of the gear assembly ranges from 6:1 to 14:1, from 6.1 to 12:1, from 7:1 to 11:1, or from 8:1 to 10:1.

7. The turbomachine engine of any of the clauses herein, wherein the gear assembly is a star gear configuration in which a planet carrier gears is fixed relative to the turbomachine engine and does not rotate.

8. The turbomachine engine of any of the clauses herein, wherein the gear assembly is a planetary gear configuration in which the ring gear is fixed relative to the turbomachine engine and does not rotate.

9. The turbomachine engine of any of the clauses herein, wherein the fan assembly is a single stage of unducted fan blades.

10. The turbomachine engine of any of the clauses herein, wherein the first stage planet gear has a first diameter and the second stage planet gear has a second diameter, wherein a ratio of the first diameter to the second diameter ranges from 1.0 to 2.0, 1.2 to 1.7, 1.3 to 1.6, or 1.4 to 1.5.

11. The turbomachine engine of any of the clauses herein, further comprising two rows of roller bearings that support, respectively, the third gear set and the fourth gear set of the second stage planet gear.

12. The turbomachine engine of any of the clauses herein, wherein there are three planet gear layshafts (330).

13. A gear assembly (102, 202, 302) for use with a turbomachine, the gear assembly comprising a sun gear (304); a plurality of planet gear layshafts (330) that each support a first stage planet gear (306) and a second stage planet gear (308), and a ring gear (310), the planet gear layshaft (330) comprising a first outer portion (334), a second outer portion (334), and an intermediate portion (332) between first and second outer portions. The first stage planet gear (306) comprises a first gear set (316) and a second gear set (318) supported at the intermediate portion of the planet gear layshaft, and the second stage planet gear (308) comprises a third gear set (320) supported at the first outer portion of the planet gear layshaft and a fourth gear set (322) supported at the second outer portion of the planet gear layshaft, and the plurality of planet gear layshafts have a tubular shape.

14. The turbomachine engine of any of the clauses herein, wherein the teeth of the first gear set are angularly clocked by a first amount of a gear pitch with regards to the teeth of the second gear set.

15. The turbomachine engine of clause 14, wherein the first amount is between one fourth and one half.

16. The turbomachine engine of any of the clauses herein, wherein teeth of the third gear set are angularly clocked by a second amount of the gear pitch with regards to the teeth of the fourth gear set.

17. The turbomachine engine of clause 16, wherein the second amount is between one fourth and one half.

18. The turbomachine engine of any of the clauses herein, where the rollers are made by ceramic material.

19. The turbomachine engine of any of the clauses herein, wherein the rollers are lubricated under race.

20. The turbomachine engine of any of the clauses herein, wherein the inner supporting element of the first and second roller bearings is a solid unique element.

21. The turbomachine engine any of the clauses herein, wherein each layshaft has a plurality of scavenge holes in its largest section of an inner tubular cavity.

22. The turbomachine engine of any of the clauses herein, wherein the sun gear is connected to a turbine via an input shaft and wherein at least one bending flexible element is present.

23. The turbomachine engine of any of the clauses herein, wherein the flexibility of the input shaft is provided, at least in part, via at least a pair of thin flanges bolted together.

24. The turbomachine engine of any of the clauses herein, wherein the flexible element comprises radial passages for oil scavenge.

25. The turbomachine engine of any of the clauses herein, wherein the input shaft is connected via a spline to the turbine shaft.

26. The turbomachine engine of any of the clauses herein, wherein the carrier is connected to the engine frame via a flexible support system.

27. The turbomachine engine of any of the clauses herein, wherein the flexible support system connecting the carrier to the engine frame is configured to collect oil and scavenge oil via holes at a lower portion.

28. The turbomachine engine of any of the clauses herein, wherein the bolting diameter of at least one flange in the input shaft is higher than the innermost arc of the bore of the layshaft pin.

29. The turbomachine engine of any of the clauses herein, wherein the bolting diameter of at least one flange in the input shaft is lower than the outermost arc of the bore of the layshaft pin.

30. The turbomachine engine of any of the clauses herein, further comprising a plurality of radial passages for oil scavenging in the flanged portion of the ring gear.

We claim:

1. A turbomachine engine comprising:
a fan assembly comprising a plurality of fan blades;
a core engine comprising a turbine and an input shaft rotatable with the turbine; and
a gear assembly that receives the input shaft at a first speed and drives an output shaft coupled to the fan assembly at a second speed, the second speed being slower than the first speed, the gear assembly comprising a sun gear, a plurality of planet gear layshafts that each support a first stage planet gear and a second stage planet gear, and a ring gear, the sun gear rotating about a longitudinal centerline of the gear assembly,
wherein the plurality of planet gear layshafts have a tubular shape that comprises a first outer portion and a second outer portion that support the second stage planet gear, and an intermediate portion between first and second outer portions that supports the first stage planet gear, and each of the planet gear layshafts is supported by a first row of cylindrical roller bearings at the first outer portion and a second row of cylindrical roller bearings at the second outer portion, and
wherein each of the planet gear layshafts comprises a plurality of scavenge holes in the intermediate portion, and
wherein the first and second outer portions have a first diameter and the intermediate portion has a second diameter, and the second diameter is greater than the first diameter.

2. The turbomachine engine of claim 1,
wherein the first stage planet gear comprises a first gear set and a second gear set supported at the intermediate portion of the planet gear layshaft, and the second stage planet gear comprises a third gear set supported at the first outer portion of the planet gear layshaft and a fourth gear set supported at the second outer portion of the planet gear layshaft.

3. The turbomachine engine of claim 2, wherein the sun gear, the first stage and second stage planet gears, and the ring gear comprise double helical gears.

4. The turbomachine engine of claim 2, wherein the third and fourth gear set are spaced apart by the first and second gear set.

5. The turbomachine engine of claim 2, wherein the ring gear comprises a first ring gear set that meshes with the third gear set and a second ring gear set that meshes with the fourth gear set.

6. The turbomachine engine of claim 1, wherein a gear ratio of the gear assembly ranges from 6:1 to 14:1.

7. The turbomachine engine of claim 1, wherein the gear assembly is a star gear configuration in which a planet carrier does not rotate.

8. The turbomachine engine of claim 1, wherein the gear assembly is a planetary gear configuration in which the ring gear does not rotate.

9. The turbomachine engine of claim 1, wherein the fan assembly is a single stage of unducted fan blades.

10. The turbomachine engine of claim 1, wherein the first stage planet gear has a first diameter and the second stage planet gear has a second diameter, wherein a ratio of the first diameter to the second diameter ranges from 1.0 to 2.0.

11. The turbomachine engine of claim 1, wherein there are three planet gear lay shafts.

12. A gear assembly for use with a turbomachine, the gear assembly comprising:
   a sun gear;
   a plurality of planet gear layshafts that each support a first stage planet gear and a second stage planet gear; and
   a ring gear, the planet gear layshaft comprising a first outer portion, a second outer portion, and an intermediate portion between first and second outer portions,
   wherein the first stage planet gear comprises a first gear set and a second gear set supported at the intermediate portion of the planet gear layshaft, and the second stage planet gear comprises a third gear set supported at the first outer portion of the planet gear layshaft and a fourth gear set supported at the second outer portion of the planet gear layshaft, and the plurality of planet gear layshafts have a tubular shape that comprises a first outer portion, a second outer portion, and an intermediate portion between first and second outer portions,
   wherein each of the planet gear layshafts is supported by a first row of cylindrical roller bearings at the first outer portion and a second row of cylindrical roller bearings at the second outer portion, and
   wherein each of the planet gear layshafts comprises a plurality of scavenge holes in the intermediate portion, and
   wherein the first and second outer portions have a first diameter and the intermediate portion has a second diameter, and the second diameter is greater than the first diameter.

13. The gear assembly of claim 12, wherein teeth of the first gear set are angularly clocked by a first amount of gear pitch with regards to teeth of the second gear set.

14. The gear assembly of claim 13, wherein the first amount is between one fourth and one half.

15. The gear assembly of claim 12, wherein teeth of the third gear set are angularly clocked by a second amount of gear pitch with regards to teeth of the fourth gear set.

16. The gear assembly of claim 15, wherein the second amount is between one fourth and one half.

17. The gear assembly of claim 12, where the roller bearings comprise ceramic material.

18. The gear assembly of claims 12, wherein the roller bearings are lubricated under race.

* * * * *